Inventor
Henry A. Macro.

By Clarence A. O'Brien
and Harvey B. Jacobson
Attorneys

Sept. 7, 1948.     H. A. MACRO     2,448,899
SEEDLING PLANTING DEVICE
Filed Oct. 2, 1946     2 Sheets-Sheet 2
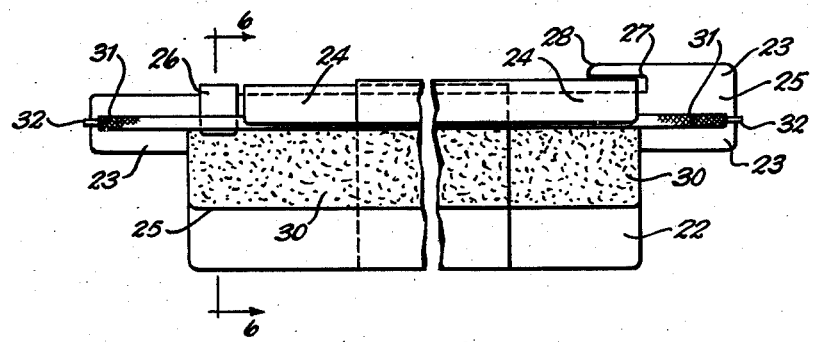
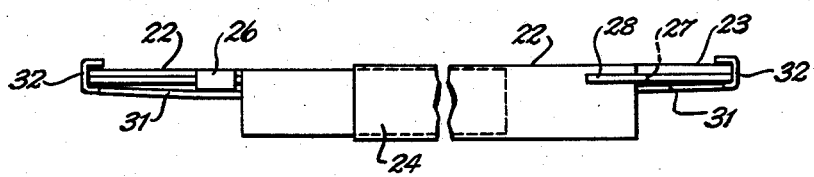
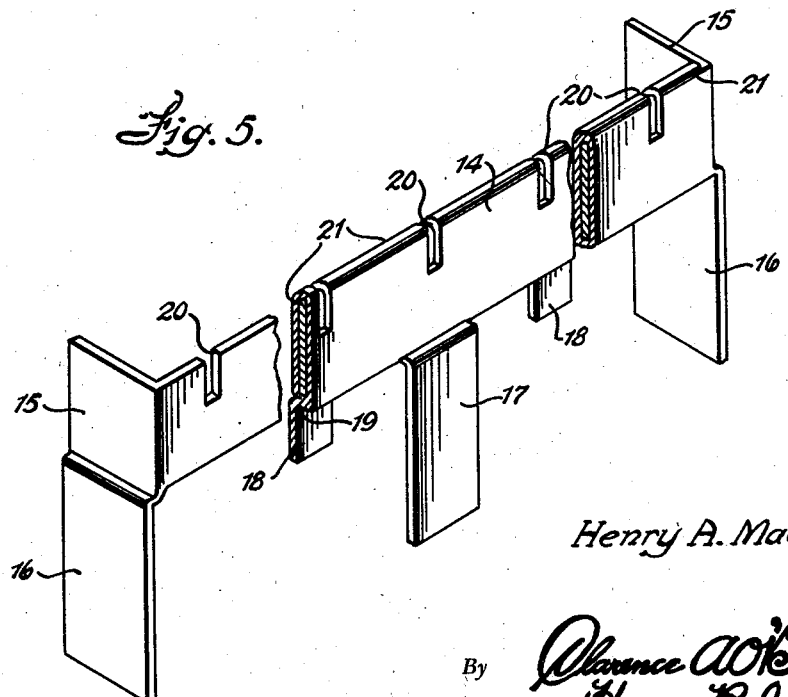
Inventor
Henry A. Macro.
By Clarence A. O'Brien
and Harvey B. Jacobson
Attorneys Patented Sept. 7, 1948

2,448,899

UNITED STATES PATENT OFFICE 2,448,899

SEEDLING PLANTING DEVICE

Henry A. Macro, Sheridan, N. Y.

Application October 2, 1946, Serial No. 700,614

5 Claims. (Cl. 111—2)

My invention relates to a seedling planting device, designed for use in greenhouses or under glass or cover to grow young plants or flowers, and especially vegetables, such as tomatoes, cabbage and the like, or those having no such facilities, so that the plants can be set out in the early spring by gardeners.

An object of the invention is to provide a simple device for use by growers, so that a maximum number of seedlings, after sprouting, can be arranged or planted in a box, for early growth, in such a manner that the planting thereof without injury to the plant is facilitated, with a maximum number evenly arranged or distributed, so that their growth is facilitated and hastened, without covering the plants with dirt or using the old antiquated method of providing a box of dirt and then individually making holes by means of a peg or the like, for putting the plants therein and then filling in the holes around the plants, and which results in dirt falling all over the plants and leaves thereof to impede growth, and sometimes result in disease or stunting of the growth of the plant.

The invention provides improved means by which the plants are held in position in the box before the dirt is put therein, evenly distributed and spaced to accommodate a maximum number for proper growth, and to protect the young leaves thereof, so that the dirt may be drawn therein, to fill the boxes to the next necessary height, without in any manner covering or injuring the plants and also facilitating removal thereof when sold for planting in gardens and subsequent growth and production.

Other objects and advantages reside in the details of construction and operation as more fully hereinafter described and claimed, reference being had to the accompanying drawings forming part hereof, wherein like numerals refer to like parts throughout, and in which—

Figure 3 is an elevation of one of the seedling planting elements for holding the plants in position in the box.

Figure 4 is a top plan view of the device shown in Figure 3.

Figure 5 is a perspective view partly broken away of a mounting for the seedling planting device and especially the plant holding elements.

Figure 1:
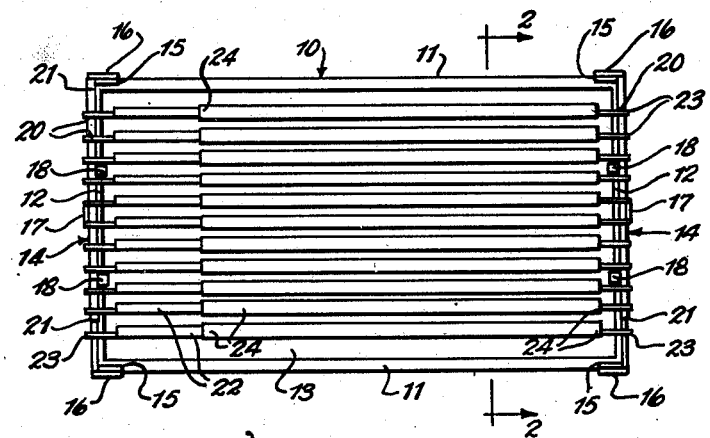
Figure 1 is a plan view of my seedling planting device applied to a box or tray commonly known as a flat for initial planting of seedlings.

Referring to the drawings, in which like reference characters designate coresponding parts throughout the several views, 10 designates the usual shallow box, tray or flat, of any suitable material but commonly of wood having side walls 11, end walls 12 and a bottom 13, such boxes being usually of standard size, such as 24" x 13" or otherwise. Irrespective of the exact size, the device is usually rectangular in plan, and while it is ordinarily customary, to place the required rich dirt in the box, usually to a point close to the open top edge thereof, and then make holes to put the plants in, in the seedling stage by means of a peg, pin or the like and then to fill in the holes around the plants, in accordance with the present invention, the seedling device consists of a strip 14 of suitable sheet material, such as metal, plastic, Bakelite or other suitable sheet material, cardboard or otherwise, designed to reach across the outside of the ends 12 and having right angularly bent ends 15, which are bent against the outer surfaces of the box sides 11 and the corners of the box or tray. These right angularly bent ends 15, which are disposed vertically like the strip 14, are extended downwardly below the bottom edge of the strip 14, as indicated at 16, in order to fit firmly against the sides 11, and if necessary, to extend to the bottom thereof to give additional support if desired. However, in order to further support the strips 14 in position, they are provided with outwardly offset depending central tongues 17 which fit against the ends 12 and also may extend to the bottoms thereof for additional support. In addition, inwardly offset shorter tongues 18 are provided at the bottom edge of the strip 14 between the vertical extensions or tongues 16 and the intermediate tongue, extension or depending strip 17, offset inwardly as indicated at 19, to extend over the top edges of the ends 12 and thereby retain the strips 14 in position. The top of the strip 14, which is arranged horizontally, is preferably provided with a plurality of short vertical slots 20 extending through the top edge thereof at each end of the box and the strip 14 may fit within said ends or set upon the top edges thereof with the depending strips, extensions or tongues 16 and 17 offset outwardly so that the offset portions engage the top edges of the box at the ends and sides adjacent to the ends or corners of the box, with the short extensions 18 offset inwardly and extending against the inner faces of the ends of the box. This construction firmly holds the supporting strips 14 in position on the ends 12 and at the adjacent corners of the sides 11.

Also, the strips 14 at the ends of the box are made in two sections slidably connected as at 21, so as to permit the same to be shortened or lengthened according to the width or length of the box, depending upon the position in which they are mounted upon the box, either at the ends or sides, as it is thought will be obvious. While the slots 20 are vertical and parallel, and may be placed any suitable distance apart, they are preferably placed from one-half to one inch apart, depending upon the type of seedling plant being planted to initially germinate the same individually for subsequent transplanting. Also, adjustment of the sections of the strips 14 will permit accommodation thereof to boxes of different sizes, or to be mounted on the ends or long sides thereof, or even if the sides of the boxes are of the same length. Where the sections overlap, the slots must mate or register to give the effect of a single slot. Also, where the slots are one-half inch apart, only alternate slots may be used for mounting the plant holding devices, means or elements so that the distance between the plants or rows thereof, will be one inch, although this may be varied if desired.

Figure 2:
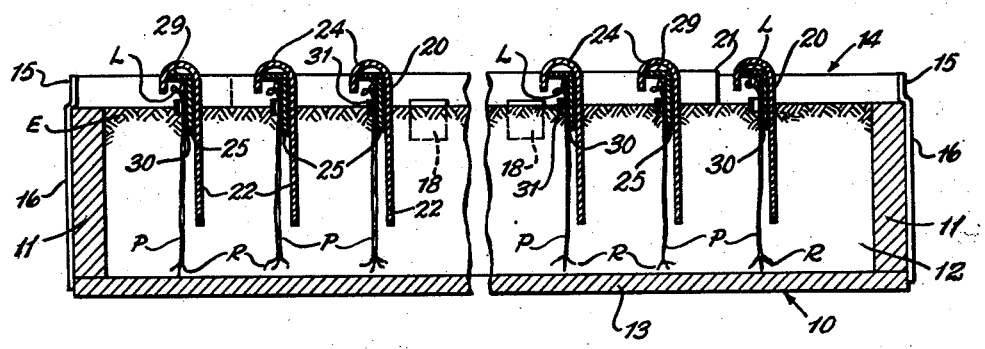
Figure 2 is an enlarged sectional view taken on the line 2—2 of Figure 1 and partly broken away.
Figure 6:
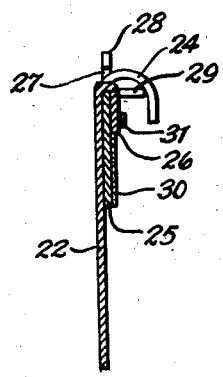
Figure 6 is a sectional view taken on the line 6—6 of Figure 3.

The plant holding devices, means or elements proper as referred to, consist of flat strips 22 having reduced upper ends or extensions 23 adapted to enter the slots 21 at opposite ends of the box, tray or flat and support the plates or strips 22 in position extending down into the box. Also, the top edges of the strips 22 are provided with turned over or overhanging extensions or portions 24 bent in curved formation as more particularly shown in Figures 2 and 6 of the drawings, to form protecting members or covers for the leaf growths at the tops of the plants to protect the same and prevent the dirt from being thrown thereon as will be further explained. Mounted against the strips 22 under the overhanging portions 24 are strips 25 which are resiliently and frictionally held between one face of a strip 22 beneath the overhanging portion 24 by means of downwardly bent spring tongues or clasps 26 adjacent one end of each strip 22 and at the opposite end, formed therewith an upwardly offset slot 27 running horizontally to form an overhanging lug or tongue 28 which receives the overhanging portion 24 at the opposite end of the strip 22 when the strip 25 is slid into position horizontally beneath the overhanging portion 24. This strip 25 also has a right angularly directed overhanging flange or cover portion 29 at the top bent at right angles thereto, to be received within the overhanging portion 24 of the strip 22 and overlie the small plants to protect the same, when the plants indicated at P with the roots R and the leaf growths L, are held against the strips 25, preferably by providing said strips with a fabric covering of felt, cloth or the like, as indicated at 30. Means are provided to hold the plants against the felt or cloth covering, and strips 25, and shown as elastic bands or strips 31, removably anchored on the strips 25 as by means of hooks 32 at the ends thereof, engaging over the ends or reduced portions 23 of the strips 22. By this means, the plants are held in upright positions, so as to extend substantially to the bottom of the box or tray, with the strips 22 extending down in close proximity to the bottom 13 or at a suitable spaced distance therefrom, one-half of an inch or otherwise. Thus, the elastic strips or bands hold the plants in position against the strips 25 and in place in the box or wherever used. Since the strips 22 and 25 are substantially the same length, the ends thereof also rest in the slots 20 and when mounted in position in the box, with the plants held as described, for the full depth of the box, or as near the bottom as possible, the dirt or earth is put into the box and levelled over at the proper height. This is clearly shown at E in Figure 2 of the drawings. The overhanging portions 24 and 29 or flanges formed thereby, will protect the leaf growths of the plants from the earth and injury, and then the strips or pieces 22 and 25 are subsequently removed, leaving the plants exposed and extending up from the earth. However, in doing this, the strips 25 are first removed after removing the elastic bands or strips 31 therefrom, in a horizontal or longitudinal direction to disengage the extension lugs or tongues from over the over-hanging portions 24 and the opposite ends of the strips 25 from beneath the spring tongues 26. Then the strips 22 are lifted upwardly from the plants and earth, and crevices which are left thereby, may be filled in by pressing down on the earth or by adding additional small quantities of earth at such points. Thus, the plants are properly imbedded in the earth in the boxes before the elastic bands are released and the strips 22 and 25 removed, after which the end strips 14 are removed from the box. The offset tongues or depending portions 16, 17 and 18 hold the ends removably in position to the box, and against dislocation, until the plants are imbedded in properly spaced relation and the parts removed as described.

With the standard boxes or flats 13" x 24", the plants are set one inch apart or eight rows of thirteen plants to the row giving one hundred and four plants to the box, thereby requiring eight slots 20 when the strips 14 are set in position, or the aligned or registering slots thereof one-half inch apart, are in registry by reason of the sections 21 of the strip 14 being adjusted to fit the box. There are also eight of each of the strips 22 and 25 together with the elastic bands or strips holding the plants in place when said strips 22 and 25 are engaged in the slots 20 with covers or protectors over the plants, to expose the plants only on one side at which the elastic strips are provided, thereby permitting the dirt or earth which is filled into the box to securely imbed the plants in position.

Of course, it is to be understood that the boxes may be of any size, and when used in open hole frames, may be as much as five feet long, using the strips 22 and 25 with or without the strips 14 as described, in order to hold the plants in position in larger numbers, but spaced apart as previously described. Thus, any size device may be used in a greenhouse, or in any suitable size box or tray, with means for holding any desired number of plants, as will be apparent. The device will obviously speed up and facilitate the planting of seedling plants and the growth thereof by being uniformly planted in spaced relation, to give proper room for growth and expansion and so that they will properly take root to produce strong healthy plants. In this way, the work of the attendant or planter especially in greenhouses or otherwise, for preparing growing plants for sale, will be greatly facilitated.

While in the foregoing there has been shown and described the preferred embodiment of this invention it is to be understood that minor changes in the details of construction, combination and arrangement of parts may be resorted to without departing from the spirit and scope of the invention as claimed.

I claim as my invention:

1. A seedling planting device, comprising a strip having means for mounting the ends thereof adjacent the earth surface, and means for anchoring plants thereto, said strip having an overhanging cover portion to protect the plants, and an elastic strip mounted against said first named strip to secure the plants therebeneath in spaced relation beneath said overhanging cover portion.

2. A seedling planting device, comprising a strip having reduced end portions adapted to be mounted on the top edge of a box or strip over the earth, said strip having an overhanging portion, and a second strip of substantially the same length as the first strip and adapted to be held against the first strip beneath said overhanging portion, and an elastic band held against the second strip.

3. A seedling planting device comprising a strip having reduced end portions adapted to be mounted on the top edge of a box or strip over the earth, said strip having an overhanging portion, and a second strip of substantially the same length as the first strip and adapted to be held against the first strip beneath said overhanging portion, said second strip having a soft covering on one face and a top flange under said overhanging portion, means to secure said second strip to the first strip, and a flexible band removably attached to the face of the second strip against said soft covering.

4. A seedling planting device comprising a flat plate-like strip having reduced end portions and an overhanging intermediate portion, a spring tongue adjacent one end of said overhanging portion and its reduced end portion, a second strip held beneath said tongue and having a longitudinal slot at the top providing an inwardly extending overhanging lug to engage over the overhanging portion at the opposite end and the slot to receive said end, said second strip having a soft covering and a top overhanging portion beneath said first named overhanging portion, a flexible elastic band having its ends anchored at the ends of the second strip against said covering, and slotted supports for the ends of said first strips to receive said ends therein.

5. A seedling planting device comprising a flat plate-like strip having reduced end portions and an overhanging intermediate portion, a spring tongue adjacent one end of said overhanging portion and its reduced end portion, a second strip held beneath said tongue and having a longitudinal slot at the top providing an inwardly extending overhanging lug to engage over the overhanging portion at the opposite end and the slot to receive said end, said second strip having a soft covering and a top overhanging portion beneath said first named overhanging portion, a flexible elastic band having its ends anchored at the ends of the second strip against said covering, and supports for said strips comprising strips having top slots for receiving the ends of the first strips and having oppositely offset depending tongues to engage the opposite ends of a box or tray for receiving dirt in which plants are imbedded when held beneath the second strip by means of said flexible band, said supports having bent ends, said offset tongues extending within and without the sides of the box.

HENRY A. MACRO.

REFERENCES CITED

The following references are of record in the file of this patent:

UNITED STATES PATENTS

| Number | Name | Date |
|---|---|---|
| 736,252 | Hering | Aug. 11, 1903 |
| 1,161,714 | Mast | Nov. 23, 1915 |

FOREIGN PATENTS

| Number | Country | Date |
|---|---|---|
| 11,787 | Norway | Apr. 27, 1903 |